(12) United States Patent
Price et al.

(10) Patent No.: US 10,432,244 B2
(45) Date of Patent: Oct. 1, 2019

(54) TRANSCEIVER ANTENNA SYSTEM FOR PLATOONING

(71) Applicant: Peloton Technology, Inc., Mountain View, CA (US)

(72) Inventors: Charles A. Price, Los Altos, CA (US); James T. O'Keeffe, Newark, CA (US); Thomas J. Birnbaum, Santa Cruz, CA (US); Ganymed B. Stanek, Mountain View, CA (US); Joshua P. Switkes, Mountain View, CA (US)

(73) Assignee: PELOTON TECHNOLOGY, INC., Mountain View, CA (US)

( * ) Notice: Subject to any disclaimer, the term of this patent is extended or adjusted under 35 U.S.C. 154(b) by 0 days.

(21) Appl. No.: 15/654,523

(22) Filed: Jul. 19, 2017

(65) Prior Publication Data
US 2018/0337703 A1 Nov. 22, 2018

Related U.S. Application Data

(60) Provisional application No. 62/509,663, filed on May 22, 2017.

(51) Int. Cl.
*H04B 1/3822* (2015.01)
*H01Q 1/32* (2006.01)
(Continued)

(52) U.S. Cl.
CPC ......... *H04B 1/3822* (2013.01); *H01Q 1/3266* (2013.01); *H01Q 1/38* (2013.01);
(Continued)

(58) Field of Classification Search
CPC ...... H04B 1/3822; H01Q 1/3266; H01Q 1/38; H01Q 11/04; H01Q 21/10; H01Q 21/062; G08G 1/22
(Continued)

(56) References Cited

U.S. PATENT DOCUMENTS 4,031,537 A 6/1977 Alford
5,649,316 A 7/1997 Prudhomme et al.
(Continued)

FOREIGN PATENT DOCUMENTS

WO 1990009041 A1 8/1990
WO 1991000626 A1 1/1991

OTHER PUBLICATIONS

Ullah et al., A Dual Band Slotted Patch Antenna on Dielectric Material, Hindawi, Jan. 28, 2014, vol. 2014, 7 pages., (Year: 2014).*
(Continued)

*Primary Examiner* — Edward F Urban
*Assistant Examiner* — Angelica M Perez
(74) *Attorney, Agent, or Firm* — Squire Patton Boggs (US) LLP

(57) ABSTRACT

A system with one or more transceiver antenna assemblies for installation in vehicle side-view mirrors to enable communication with nearby vehicles. Each transceiver antenna assembly may have one or two antenna arrays implemented on a single printed circuit board, protected by an antenna housing used to mount the transceiver antenna inside the mirror assembly. Each antenna array in a dual-channel transceiver antenna may transmit and receive data over one of two DSRC channels. One channel may be used to transmit and receive vehicle data only and the other channel may be used to transmit and receive both vehicle data and audio/video (A/V) data. Each antenna array is connected to a radio in the vehicle that processes received signals and prepares signals for transmission. Such a transceiver antenna system may be especially useful for communication in truck platooning.

14 Claims, 11 Drawing Sheets

(51) Int. Cl.
  *H01Q 1/38* (2006.01)
  *H01Q 11/04* (2006.01)
  *H01Q 21/10* (2006.01)
  *H01Q 21/06* (2006.01)
  *G08G 1/00* (2006.01)

(52) U.S. Cl.
  CPC .............. *H01Q 11/04* (2013.01); *H01Q 21/10* (2013.01); *G08G 1/22* (2013.01); *H01Q 21/062* (2013.01)

(58) Field of Classification Search
  USPC ....... 455/41.1–41.3, 90.3, 100, 103–104, 27, 455/562.1, 569.2
  See application file for complete search history.

(56) References Cited

U.S. PATENT DOCUMENTS

| | | | |
|---|---|---|---|
| 5,687,035 A | 11/1997 | Lang | |
| 5,798,882 A | 8/1998 | Lang | |
| 5,925,272 A | 7/1999 | Lang et al. | |
| 6,005,530 A | 12/1999 | Jovanovich et al. | |
| 6,019,475 A | 2/2000 | Lynam et al. | |
| 6,078,294 A | 6/2000 | Mitarai | |
| 6,081,237 A | 6/2000 | Sato et al. | |
| 6,222,494 B1 | 4/2001 | Erkocevic | |
| 6,259,412 B1 | 7/2001 | Duroux | |
| 6,317,039 B1* | 11/2001 | Thomason | G08B 13/19621 340/505 |
| 6,380,902 B2 | 4/2002 | Duroux | |
| 6,406,170 B1 | 6/2002 | Abalos et al. | |
| 6,697,024 B2 | 2/2004 | Fuerst et al. | |
| 6,734,807 B2 | 5/2004 | King | |
| 6,861,942 B1 | 3/2005 | Knapp et al. | |
| 6,980,092 B2 | 12/2005 | Turnbull et al. | |
| 7,002,524 B1* | 2/2006 | Branham | B60R 1/0605 343/713 |
| 7,248,225 B2 | 7/2007 | Yegin et al. | |
| 7,362,237 B2 | 4/2008 | Lawlor et al. | |
| 7,573,428 B2 | 8/2009 | Muramatsu et al. | |
| 7,609,216 B2 | 10/2009 | Yegin et al. | |
| 7,772,966 B2 | 8/2010 | Turnbull et al. | |
| 7,868,834 B2 | 1/2011 | Ortigosa et al. | |
| 2002/0126054 A1* | 9/2002 | Fuerst | B60C 23/0444 343/712 |
| 2002/0175867 A1* | 11/2002 | Kodama | B60R 1/12 343/713 |
| 2003/0090820 A1 | 5/2003 | Matsuura et al. | |
| 2004/0121820 A1 | 6/2004 | Unno et al. | |
| 2004/0166435 A1* | 8/2004 | Lee | C08G 61/123 430/270.1 |
| 2007/0024512 A1 | 2/2007 | Muramatsu et al. | |
| 2008/0001834 A1 | 1/2008 | Yegin et al. | |
| 2008/0204322 A1* | 8/2008 | Oswald | G01S 5/04 342/465 |
| 2009/0231219 A1 | 9/2009 | Sugimoto et al. | |
| 2010/0309066 A1 | 12/2010 | Flick et al. | |
| 2012/0182196 A1 | 7/2012 | Hung | |
| 2013/0136196 A1 | 5/2013 | Rousu et al. | |
| 2014/0125518 A1* | 5/2014 | Feller | H04B 7/00 342/357.51 |
| 2016/0054735 A1* | 2/2016 | Switkes | G08G 1/22 701/23 |
| 2016/0064805 A1 | 3/2016 | Petrucci et al. | |
| 2017/0168503 A1* | 6/2017 | Amla | G05D 1/0011 |
| 2017/0334350 A1* | 11/2017 | Rink | B60K 31/0008 |

OTHER PUBLICATIONS

Solbach, Klaus, "Microstrip-Franklin Antenna," IEEE Transactions on Antennas and Propagation, vol. AP-30, No. 4, Jul. 1982, pp. 773-775.

Byrne, John F. et al., "VHF and UHF Communication Antennas," Ch. 22 of Antenna Engineering Handbook First Edition (McGraw Hill Book Co., New York) Henry Jasik, ed., 1961, 22 pages.

Collins, Brian S., "VHF and UHF Communication Antennas," Ch. 27 of Antenna Engineering Handbook Third Edition (McGraw Hill Book Co., New York) Richard C. Johnson, ed., 1993, 26 pages.

DSRC, Spring Mount Mobile Antennas 5.9 GHz, Mobile Mark Specs, downloaded Jun. 25, 2017 from http://www.mobilemark.com/wp-content/uploads/2016/07/ECOS6-5900DN-Spec-Sheet.pdf, Apr. 2016, 1 page.

ECOS6-5900DN-BLK, Elevated Feed Omni Antenna with Mobile Spring Mount and Direct N Termination; Mobile Mark Tech Sheet, downloaded Jun. 25, 2017 from http://www.mobilemark.com/wp-content/uploads/2015/04/ECOS6-5900DN-BLK.pdf, Jun. 11, 2014, 1 page.

Reading, Leslie J., "Designing dual-band internal antennas," EDN Magazine, downloaded Jul. 31, 2017 from: http://www.edn.com/design/communications-networking/4340096/Designing-dual-band-internal-antennas; archived PDF available at: http://m.eet.com/media/1140598/179573.pdf, Nov. 3, 2001; 4 pages.

Zhao, Zijin et al., "Channel Estimation Schemes for IEEE 802.11p Standard," IEEE Intelligent Transportation Systems Magazine, pp. 38-49, 2013.

\* cited by examiner

TRANSCEIVER ANTENNA SYSTEM FOR PLATOONING

CROSS-REFERENCE TO RELATED APPLICATIONS

The present application claims priority under 35 U.S.C. § 119(e) to U.S. Provisional Application No. 62/509,663, filed May 22, 2017 entitled "Transceiver Antenna for Vehicle Side Mirrors", hereby incorporated by reference in its entirety, and is related to an Application entitled "Transceiver Antenna for Vehicle Side Mirrors" filed concurrently with the present Application and hereby incorporated by reference in its entirety.

FIELD OF THE INVENTION

The embodiments disclosed herein relate to radio frequency (RF) transceivers for communication between vehicles, and in some embodiments, RF transceivers that may be particularly useful for trucks when platooning.

BACKGROUND

In certain situations, it is desirable that vehicles in motion have the ability to reliably exchange information. Various standards have been established for such vehicle-to-vehicle (V2V) communication via wireless networks. One common set of communication channels is known as dedicated short range communication (DSRC), implementing the IEEE 802.11p standard for wireless access in vehicle environments (WAVE). In the United States, 75 MHz of spectrum in the 5.9 GHz band (5.850-5.925 GHz) has been allocated for use in intelligent transportation systems. Other countries may allocate different portions of the RF spectrum for DSRC communications.

Inter-vehicle communication using DSRC may be especially useful when two or more large trucks (such as semis) wish to achieve certain efficiencies by platooning to reduce drag and save on fuel costs. Short to medium range communication in such a situation may be used to transmit control, status, situational, and/or audio and video data between the vehicles. Parallel communication on multiple channels between vehicles may be useful to provide all the data and information needed to maintain safe and effective platooning. However, this type of communication typically requires a direct line of sight between antennas of the two vehicles for the data to be transmitted properly.

Traditional antennas are insufficient for establishing reliable multi-channel short to medium range communication connections between moving trucks. Low gain or no gain antennas have been shown to be inappropriate for vehicle-to-vehicle communication because they often incur significant ground interference. However, off-the-shelf high-gain antennas appropriate for mounting on a vehicle provide communication over only a single channel and are rather bulky and unwieldy. For example, short and medium range communication antennas for 5.8-5.9 GHz bands, such as the ECOS product line by Mobile Mark, Inc., provide only a single channel. Therefore, in order to achieve multiple simultaneous channels of communication, multiple antennas may be needed at each installation location on each vehicle.

As will be explained in more detail below, the desirable installation location for antennas used for communication between large trucks is on or within the trucks' side-view mirrors. Consequently, establishing multiple channels of communication at each mirror can require four or more off-the-shelf antennas. Additionally, the ECOS antenna is rather bulky and expensive. When such off-the-shelf DSRC antennas are installed on the side mirror of a large truck (e.g. attached to the perimeter of the side mirror and protruding above the mirror), there is a high risk that the antenna will become detached from the mirror while the truck is in motion, for example when the truck is maneuvering through tight spaces or locations with a lot of vegetation.

It is therefore apparent that a need exists for a small, reliable antenna appropriate for multi-channel communication between large, moving vehicles.

BRIEF DESCRIPTION OF THE DRAWINGS

The foregoing and other aspects of various embodiments of the present invention will be apparent through examination of the following detailed description in conjunction with the accompanying drawing figures in which similar reference numbers are used to indicate functionally similar elements.

The illustrations in the Drawings disclosed in this Application are meant to illustrate the function of various embodiments, and are typically not shown to scale. Any specific details regarding specific dimensions of various elements and any relationships between them should be provided in descriptions in the text of the Specification and the attached Claims.

DETAILED DESCRIPTION

The present invention relates to a transceiver antenna to be installed in a vehicle side-view mirror to enable short and medium range communication with nearby vehicles. The transceiver antenna is designed to fit within the side view mirror of a vehicle, preventing additional wind resistance. In some embodiments, the transceiver is designed to transmit and receive radio signals over DSRC channel. According to an embodiment, each transceiver antenna may include a single antenna array. According to an embodiment, each transceiver antenna may include two antenna arrays implemented on a single printed circuit board, oriented such that each antenna array is in the null space or region of the other to minimize interference and cross-talk (a dual-channel antenna). In an embodiment, the transceiver antenna may be encased in an antenna housing configured to safely mount the transceiver antenna in a side mirror of a vehicle while minimizing interference and protecting the transceiver antenna.

Each antenna array in the transceiver antenna will transmit and receive data over an assigned radio channel. In the case of the dual-channel antenna, each antenna array will transmit and receive data over one of two assigned channels. One channel may be used to transmit and receive vehicle data, whereas the other channel may be used to transmit and receive both vehicle data and audio and/or video (A/V) data. Each antenna array is connected to a radio within the vehicle that processes received signals and prepares signals for transmission.

As noted above, the type of desired communication between vehicles typically requires a direct line-of-sight between antennas for the data to be transmitted properly. However, this can be problematic for tractor-trailer semis. Because a large truck with a tractor-trailer (e.g. a semi) may have a trailer that is taller than the cab, and because the truck and trailer are independent and therefore can articulate, it is difficult to maintain short range line-of-sight communication.

Figure 1:
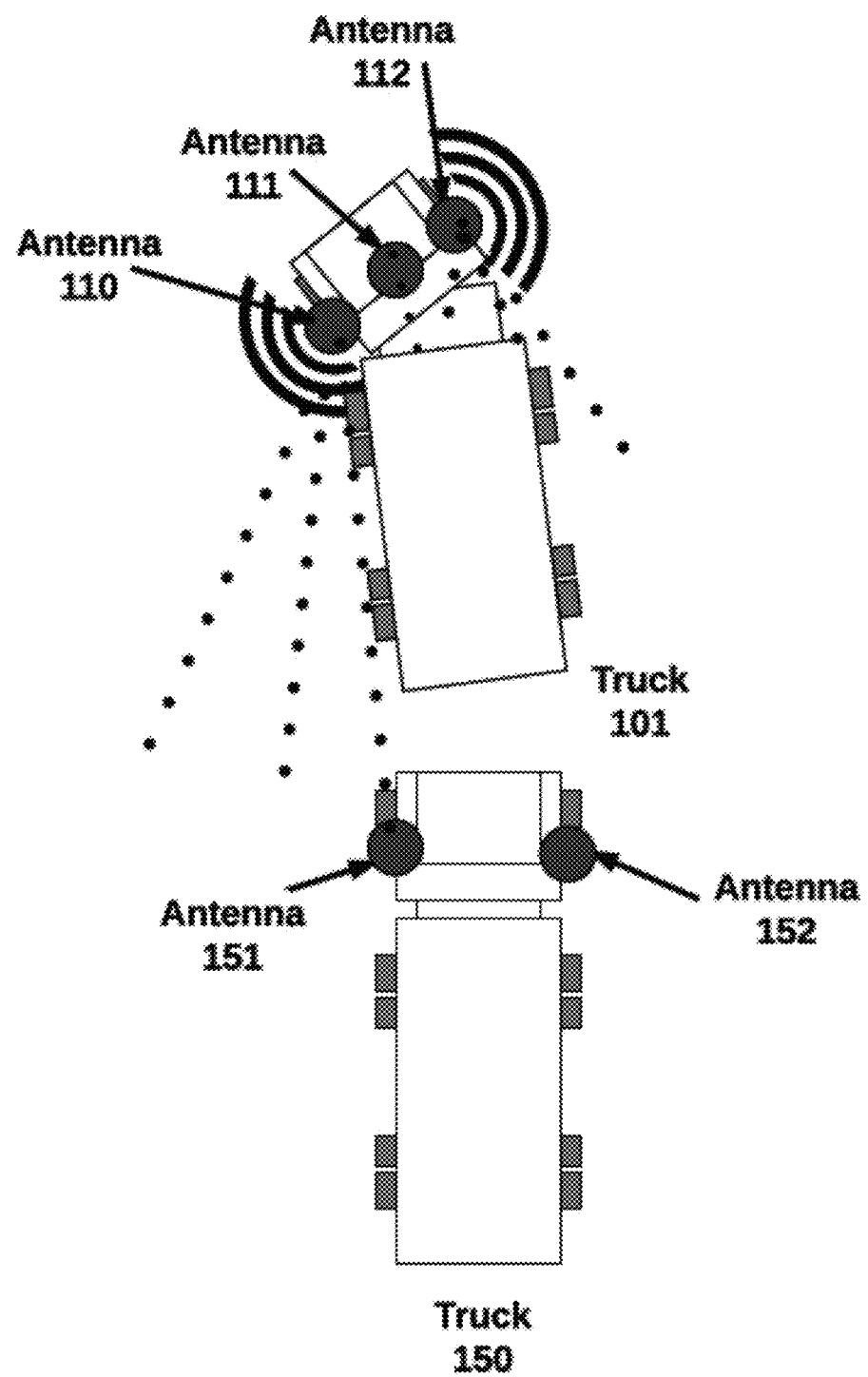
FIG. 1 is a top-view diagram that illustrates an exemplary pair of vehicles that may require vehicle-to-vehicle communication.

FIG. 1 illustrates an exemplary pair of trucks that may require truck-to-truck (or vehicle-to-vehicle (V2V)) communication. In FIG. 1, the lead truck 101 has multiple options for antenna locations. Three exemplary antenna locations 110, 111, 112 are shown. One of the illustrated exemplary antenna locations 111 is in the middle of the truck cab. However, as can be seen in FIG. 1, the middle antenna 111 may not have a direct line of sight with the following truck 150, for example, because of the trailer height. Any antenna used for short to medium range communication between two tractor-trailer trucks cannot therefore rely on an antenna that is placed on or within the body of the cab. Placing an antenna on the trailer would also be problematic as the trailer and the cab are often disconnected, and the trailers are often exchanged between different truck cabs. Either the antenna would have to be disconnected from one trailer and attached to the new trailer, or a new antenna permanently attached to the new trailer would have to be connected to the radio in the cab whenever the trailer is switched on a truck.

However, placing an antenna at locations 110, 112 in each side mirror of the cab increases the likelihood that the lead truck 101 will have at least one side mirror (and therefore one antenna) in direct line of sight with at least one side mirror (and therefore one antenna) of the following truck 150. One antenna, for example the antenna in the right side location 112, may not be in direct line of sight with any antenna on the following truck 150 when the lead truck 101 is turning left. However, if the antenna in the right-side location 112 is blocked, the antenna in the left-side location 110 should still have a direct line of sight to one of the antenna locations 151, 152 on the following truck 150. Therefore, regardless of the articulation of the cab and trailer or the height of the trailer, with an antenna in each side mirror location, one of the antennas should always be capable of transmitting a short to medium range signal to at least one of two antennas mounted in the side mirrors of a following truck.

Once communication is established between two vehicles, using DSRC for example, the antenna may transmit and receive data on any DSRC dedicated channel. According to an embodiment, the antenna may be tuned to transmit and receive data via any one of seven dedicated channels within the DSRC band (one channel being a control channel, and six channels being service channels) or may dynamically hop frequencies as required to ensure the data is correctly transmitted and received.

The types of data that may be transmitted between trucks include vehicle data and audio/video (A/V) data.

According to an embodiment, the vehicle data may include information critical for safety, as well as control data for the vehicle. Such safety-critical information may include acceleration information, braking information, system activation/deactivation, system faults, range or relative speed, or other data streams related to vehicle control. The vehicle data may also include the vehicle's recent GPS coordinates, its present estimated velocity, an estimate of the relative velocity of the vehicles, and other navigation and orientation information as may be needed for safe platooning.

The vehicle data may additionally include one or more signals that do not directly carry information encoded as a bitstream, but may be used to allow information about the vehicle, such as its relative speed and relative distance, to be determined. For example, the vehicle data may comprise a steady signal at a predetermined RF frequency broadcast by one vehicle, from which a second vehicle may infer information about the vehicles' relative speed from the Doppler shift of the received signal.

In an embodiment, the vehicle data may be transmitted on one channel while the A/V data is transmitted on another channel. In an embodiment, the vehicle data may be transmitted on two channels while the A/V data is transmitted on only one channel. This redundant approach to the vehicle data provides a higher likelihood of successful vehicle data transmission between trucks (the A/V data having lower priority and therefore being transmitted with only one channel).

According to an embodiment, the audio/video (A/V) data may include a video stream from one or more cameras placed in or around the truck, voice communication that may be exchanged between drivers of multiple trucks, or other audio or video data as may be made available. It may include only audio data, or only video data, or some combination of audio and video data. It may include live streams of data, recorded information, or A/V data with a time delay in transmission.

Figure 2:
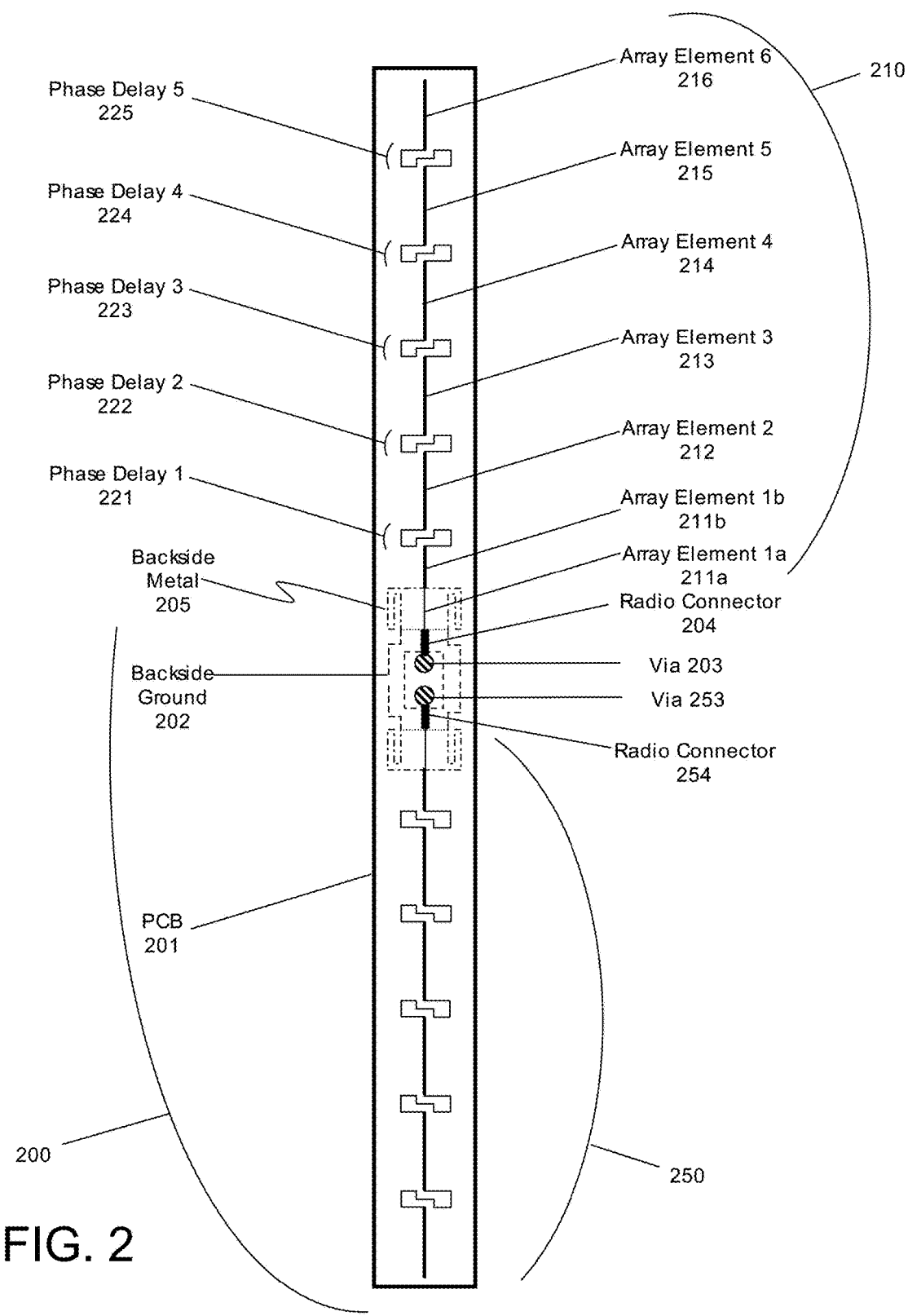
FIG. 2 illustrates an exemplary dual-channel antenna according to an embodiment.

As described above, transceiver antennas are preferred at each installation location (in some embodiments, in the truck side mirror or mirrors). A single dual-channel antenna may be utilized to minimize the number and size of components installed in each side mirror. FIG. 2 illustrates an exemplary dual-channel antenna 200 according to an embodiment, in which two antenna arrays 210, 250 are created on a single standard printed circuit board (PCB) 201. The dual-channel antenna 200 is designed to be mounted in a vehicle side-mirror and carry both signal transmission and signal reception. The PCB may be fabricated from FR-4 or other such flexible, epoxy/glass based substrates, while the antenna arrays may be fabricated from a metal such as copper coated onto the PCB substrate and subsequently patterned.

According to an embodiment, the PCB 201 may be have a thickness of approximately 30 mils (or approximately 0.76 mm). According to an embodiment, the antenna arrays 210, 250 fabricated as copper traces on the PCB may have a trace width between 12 and 35 mils (or approximately between 0.30 and 0.89 mm) and a thickness of 3.5 mils (or approximately 89 micrometers). As illustrated, the two antenna arrays 210, 250 are collinearly oriented, i.e. aligned to have the same axis of orientation. This means that each antenna array may be in the null region of the other antenna array, which can reduce or minimize interference and crosstalk between the antenna arrays. In an embodiment, the antenna may have two antenna arrays with respective axes aligned in parallel, but with an offset, i.e. not sharing the same axis. This may provide other advantages when placed within certain mirror housings, if crosstalk can be otherwise minimized.

Each antenna array may handle both signal transmission and signal reception. Each antenna array is fed from a separate radio through a via 203, 253 and a radio connector 204, 254 respectively. The radio connectors 204, 254 may be soldered to the respective antenna array to form the appropriate connection. The vias 203, 253 through the PCB 201 may provide the appropriate connection for each respective radio connector 204, 254. A ground plane 202 on the far side of the PCB 201 in the region around the connectors may be provided in some embodiments.

According to an embodiment, the vias for the radio connectors may be closely spaced. According to another embodiment, the vias may be spaced as far apart as possible, based on the length of the dual-channel antenna assembly. For example, if the antenna assembly is limited to be approximately 40 cm in length to fit within a standard truck side mirror, and the PCB is therefore limited to be approximately 36 cm in length to fit within an antenna housing having a suitable air gap, two 6-element DSRC antenna arrays may both fit on the PCB while leaving the distance between the radio connectors to be approximately 98 mm. Other embodiments having shorter antenna arrays may allow greater separation of the connectors. In some embodiments, connections may be made to the radio by using a coaxial connector, and the coaxial center wire may be connected by soldering it to the radio connector 204.

As illustrated, each antenna array 210, 250 has a number of antenna array elements. The lower antenna array 250 is the mirror image of the upper antenna array 210, and so the further description for the upper antenna array 210 may also apply in mirror image to the lower antenna array 250. The upper antenna array 210 has six (6) array elements 211a, 211b, 212, . . . , 216, each separated by one of five (5) phase delay sections 221, . . . , 225. Each array element adds gain to the received or transmitted signal. The array elements may be fabricated to have a wider trace than the delay lines, and, in an embodiment, the array elements are fabricated may have a trace width twice as wide as the delay lines. As shown in FIG. 2, an exemplary antenna array has 6 elements with 5 phase shifting delay lines between them; however, an antenna array with as few as 2 and as many as 12 array elements could also be implemented. The additional array elements in antenna arrays with more array elements, however, may only provide marginal gain after the loss of transmission through the other antenna array elements is considered.

Each array element in an antenna array may be the same length, or they may have different lengths. For example, for the upper antenna array 210 as illustrated in FIG. 2, starting at the element closest to the radio connector (Array Element 1a) and progressing outward, each subsequent array element may be a slightly longer than the element before it. In an embodiment, each array element will be 5% longer than the previous array element. This gradual lengthening may improve performance. According to an embodiment, it may be desirable to vary the lengths of the elements in the array. Exemplary array element lengths in mm for several designs of a 6-element array tuned for DSRC RF communication are shown in Table I.

TABLE I

Exemplary Antenna Array Element lengths for 5 different 6-element designs.

| Length (mm) | Array Element 1a | Array Element 1b | Array Element 2 | Array Element 3 | Array Element 4 | Array Element 5 | Array Element 6 |
| --- | --- | --- | --- | --- | --- | --- | --- |
| Design 1 | 8.0 | 8.0 | 20.5 | 20.5 | 20.5 | 20.5 | 20.5 |
| Design 2 | 7.7 | 7.7 | 18.6 | 19.5 | 20.3 | 20.3 | 20.2 |
| Design 3 | 8.0 | 8.0 | 20.5 | 21.3 | 22.2 | 23.0 | 23.9 |
| Design 4 | 8.0 | 8.0 | 20.5 | 19.7 | 19.0 | 18.3 | 17.6 |
| Design 5 | 7.7 | 7.7 | 18.6 | 19.5 | 20.5 | 21.5 | 22.6 |

The nominal trace width for all array elements is 0.8 mm, except for array element 1, which is split into two sections, array element 1a (211a) and array element 1b (211b). Of these two segments, array element 1a (211a) (closest to the radio connector) may overlap additional metal structures 205 fabricated on the backside of the PCB 201. The metal structures 205 may have "outriggers" (semi-attached wire-like structures, as illustrated) or other shapes, such as the metal ground plane 202, that together act as a balun at the junction between the radio connector 204 and the 50Ω, microstrip on the front side of the PCB 201.

The backside metal structures 205 help ensure that the cable connection itself does not serve as part of the antenna line. In some embodiments, the backside metal structures 205 may overlap exactly half of the length of array element 1, splitting element 1 into two elements 211a, 211b of equal length. In some embodiments, the trace width of array element 1a 211a over the backside metal structures 205 will be 0.34 mm, while the trace width of array element 1b 211b will be 0.8 mm. As illustrated, the radio connector 204 may also be fabricated from the copper material deposited on the PCB 201 to form the antenna array, but may typically be wider, having a width, for example, of 1.4 mm.

Similarly, the delay lines or phasing sections in each array may have constant or variable lengths. Exemplary phasing section length options for the 5 phasing sections positioned between the antenna elements in the 6-element arrays of Table I (designed with Phase Delay 1 positioned between Antenna Elements 1 and 2, etc.) are shown in Table II (shown in mm, assuming a trace width of 0.4 mm). It should be noted that these represent total trace length for the phase delay section, as the path follows a non-linear, generally serpentine path, as illustrated in FIG. 2. The actual linear physical length of the section will be shorter, often less than 10 mm.

TABLE II

Exemplary Phase Delay lengths for 5 different 6-element designs.

| Length (mm) | Phase Delay 1 | Phase Delay 2 | Phase Delay 3 | Phase Delay 4 | Phase Delay 5 |
| --- | --- | --- | --- | --- | --- |
| Design 1 | 20.5 | 20.5 | 20.5 | 20.5 | 20.5 |
| Design 2 | 16.7 | 16.7 | 17.1 | 16.7 | 16.3 |
| Design 3 | 20.5 | 20.9 | 21.3 | 21.7 | 22.1 |

TABLE II-continued

Exemplary Phase Delay lengths for 5 different 6-element designs.

| Length (mm) | Phase Delay 1 | Phase Delay 2 | Phase Delay 3 | Phase Delay 4 | Phase Delay 5 |
|---|---|---|---|---|---|
| Design 4 | 20.5 | 20.1 | 19.7 | 19.3 | 18.9 |
| Design 5 | 16.7 | 17.5 | 18.4 | 19.3 | 20.3 |

Figure 3:
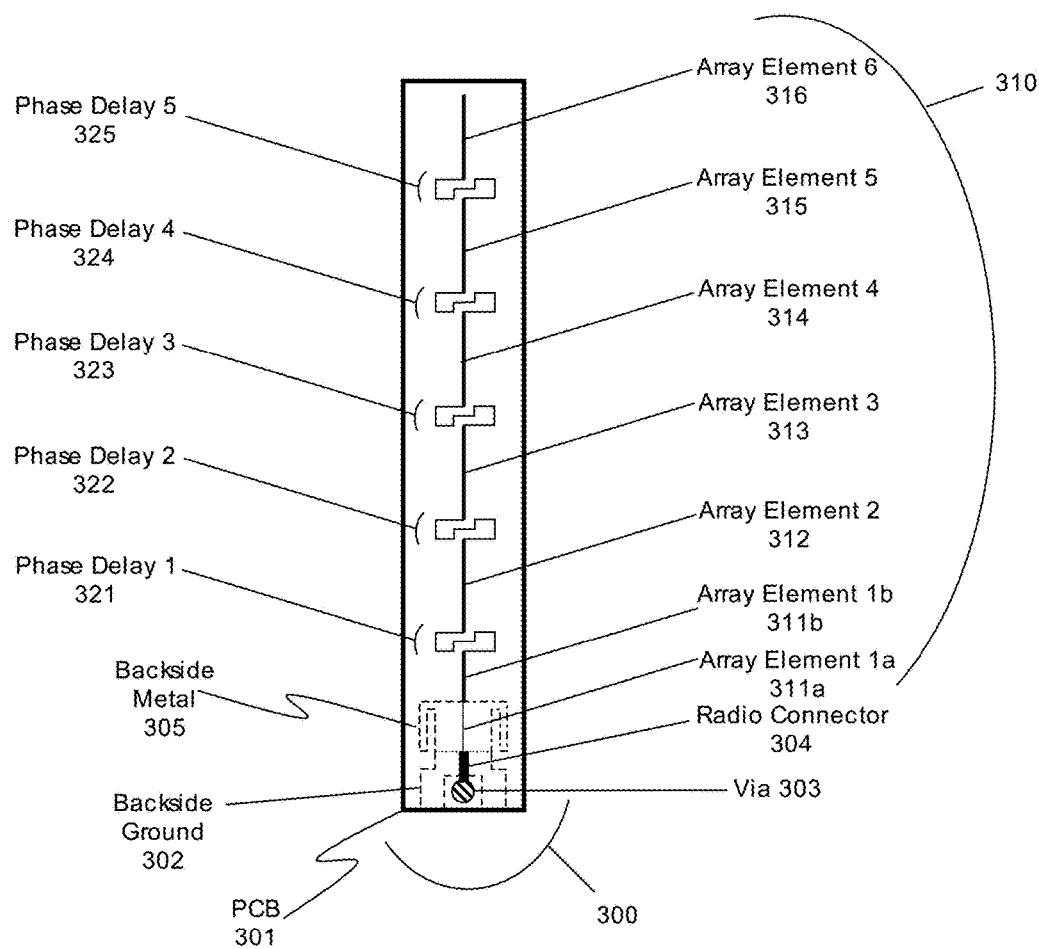
FIG. 3 illustrates an exemplary antenna according to an embodiment.

According to an embodiment, a single antenna array may be utilized. FIG. 3 illustrates an exemplary antenna 300 according to an embodiment. As shown in FIG. 3, a single antenna array 310 is created on a standard printed circuit board (PCB) 301. The single antenna array 310 is fed from a radio through a via 303 and a radio connector 304. Connections may be made to the radio by using a coaxial connector, and the coaxial center wire may be connected by soldering it to the radio connector 304. The single antenna array 310 is designed to be mounted in a vehicle side-mirror and handles both signal transmission and signal reception.

As with the dual-channel antenna described above, the single antenna array 310 has a number of antenna elements 311a, 311b, 312, . . . , 316, each separated by a delay line 321, . . . , 325 that marks a phase shifting section. Each array element adds gain to the received or transmitted signal. The lengths of the antenna array elements 311a, 311b, 312, . . . , 316 may correspond to the exemplary lengths for antenna array elements 211a, 211b, 212, . . . 216 previously shown in Table I. Likewise, the path lengths of the phase delay sections 321, . . . , 315 may correspond to the phase delay lengths 221, . . . , 225 previously shown in Table II. As shown in FIG. 3, an exemplary antenna array has 6 elements, however, an antenna array with as few as 3 or as many as 12 elements could also be implemented. As described above, each array element may be the same length, or may have different lengths.

As shown in FIG. 3, and as described for the embodiment of FIG. 2, an antenna array may include backside metal structures 305 at the junction of the antenna array and the unbalanced connector from the radio. In some embodiments, this combination may serve as a balun at the junction of the antenna array and the radio connector. According to an embodiment, the backside metal structures 305 may be created directly on the PCB by placing a patterned layer of copper at the junction on the opposite side of the PCB from the antenna trace. In some embodiments, the backside metal structures 305 may overlap exactly one half of the length of the trace of the first array element of the antenna array. As in the dual-channel antenna described above, a ground plane 302 may also be provided on the rear side of the PCB in the region of the radio connector 304.

Figure 4:
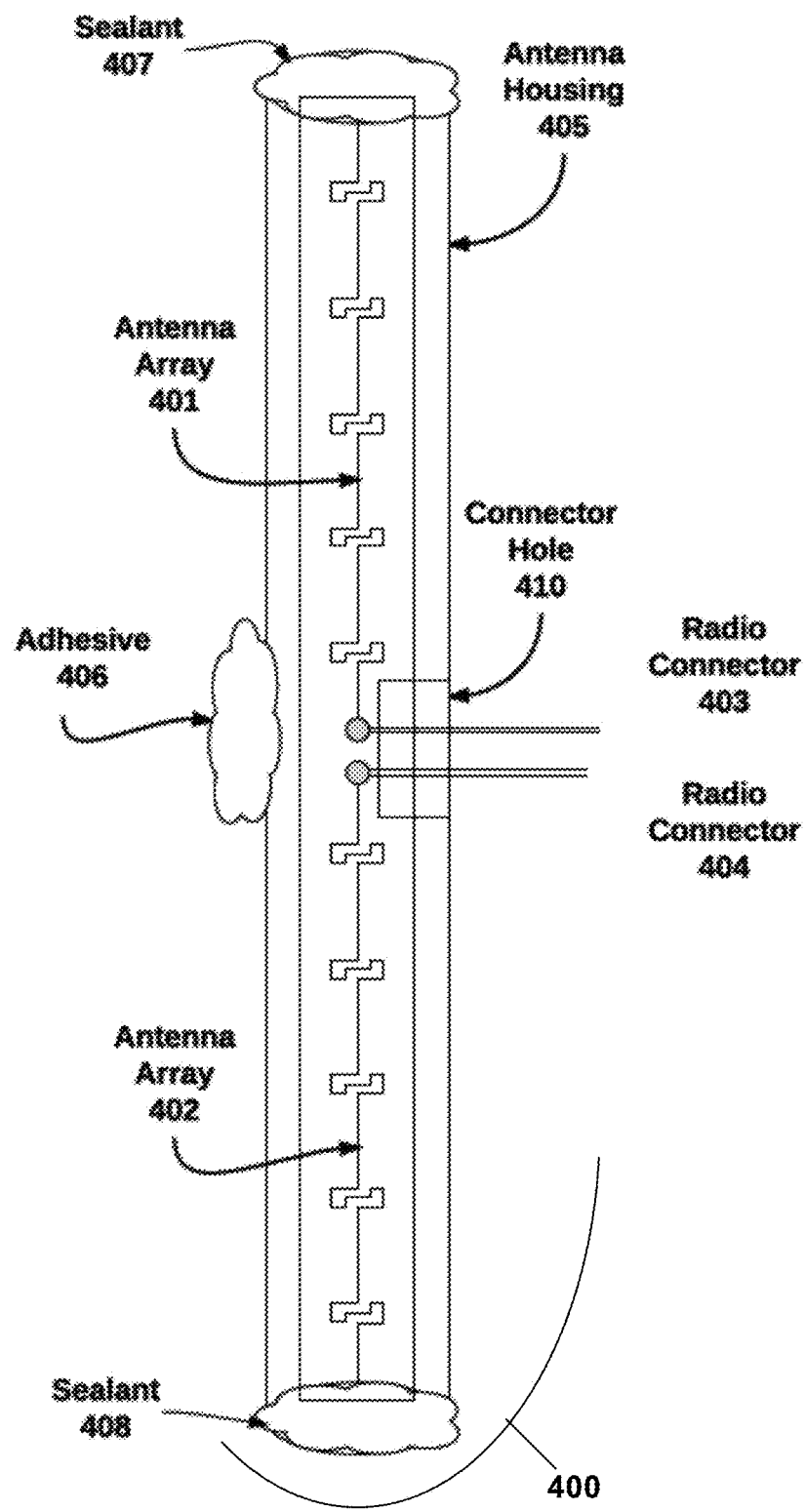
FIG. 4 illustrates an exemplary antenna assembly for a dual-channel antenna according to an embodiment.

To properly fit and operate the dual-channel antenna within the side mirror of a vehicle, a custom antenna housing designed to fit within the mirror housing may be employed. To fit within the tall vertical housing typical of truck mirrors, a vertically oriented custom antenna housing may be used. FIG. 4 illustrates an exemplary antenna assembly 400 according to an embodiment. As shown in FIG. 4, the antenna board having the two antenna arrays 401, 402 is placed in a housing 405 fabricated using circular plastic tubing, and the tubing is sealed at each end with sealant 407, 408. The sealant 407, 408 is used to keep the antenna board in place and to make the antenna water and weather resistant. The wire feeds from the radio connectors 403, 404, which include grounding for each antenna array, is attached to the respective antenna array 401, 402 in the center where a small hole 410 in the housing 405 allows the wires through. An adhesive 406 or other connection mechanism may be applied to the outside of the housing 405 to mount the dual-channel antenna and housing within a side mirror of a truck.

Figure 5:
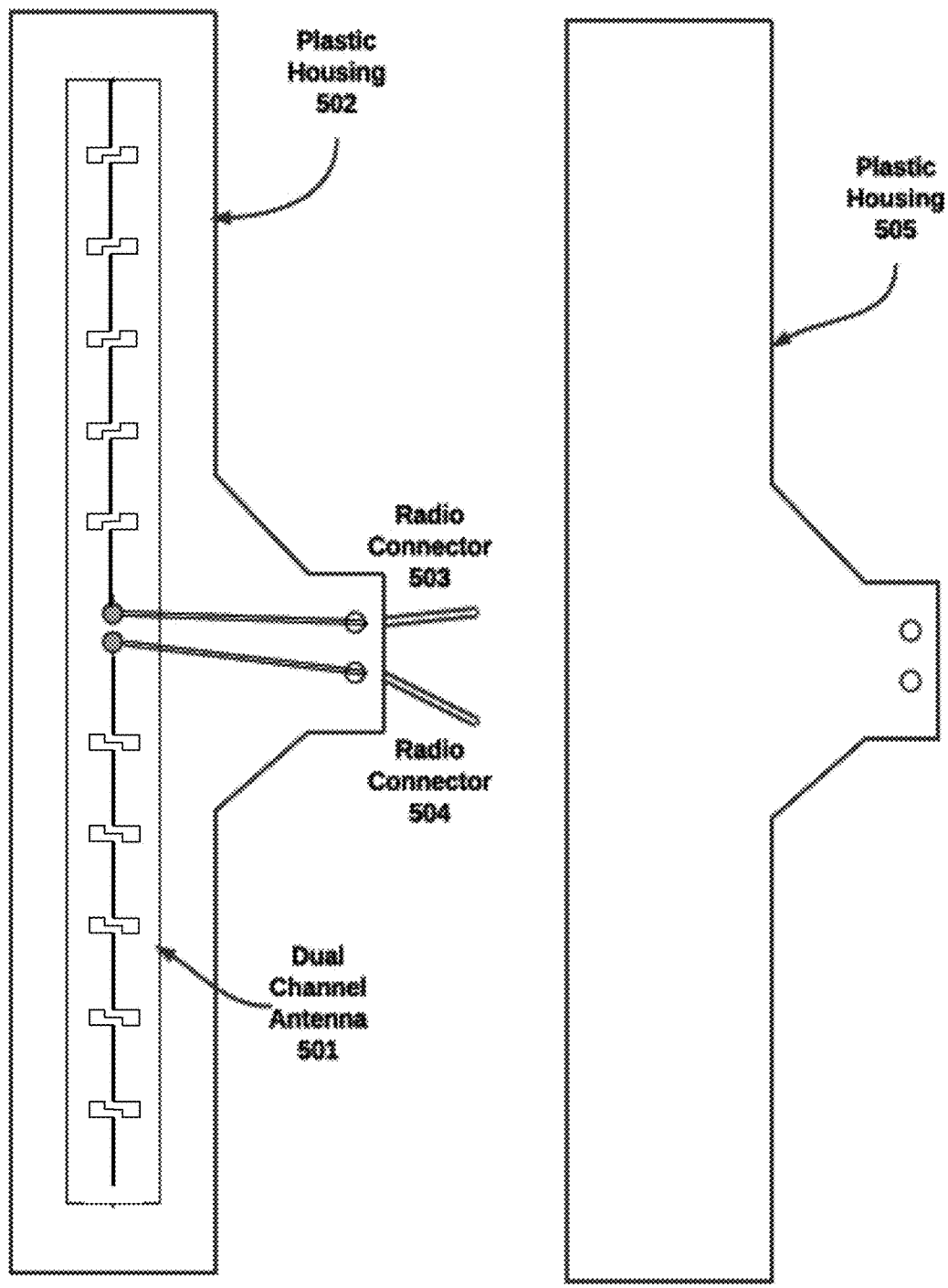
FIG. 5 illustrates an exemplary antenna housing for a dual-channel according to an embodiment.

FIG. 5 illustrates another exemplary antenna housing according to an embodiment. As shown in FIG. 5, the dual-channel antenna board 501 with two antenna arrays is placed on a flat piece of plastic that makes up one half of a plastic housing 502. Each of the radio connectors 503, 504, which may be provided using a coaxial cable and may include grounding for each antenna array, is attached to the respective antenna array near the center of the dual-channel antenna board 501. Two or more small holes are used to thread the wire carrying radio feeds from the dual-channel antenna 501 out of the plastic housing 502. Then a similar piece of plastic housing 505 is placed on top of the first piece 502 and the dual-channel antenna 501, sandwiching the dual-channel antenna 501 between the two pieces of plastic housing 502 and 505. The plastic of the plastic housing 502, 505 may be acrylic, acrylonitrile butadiene styrene (ABS), or any thermal plastic. According to an embodiment, the two pieces of plastic forming the plastic housing 502, 505 may be snapped together. According to an embodiment, the two pieces of plastic housing 502 are sealed on all sides to make the antenna assembly weather resistant. The sealed antenna assembly may be mounted within a side mirror of a vehicle. According to an embodiment, the total thickness of the antenna and antenna housing will be less than 6.5 mm.

Figure 6A:
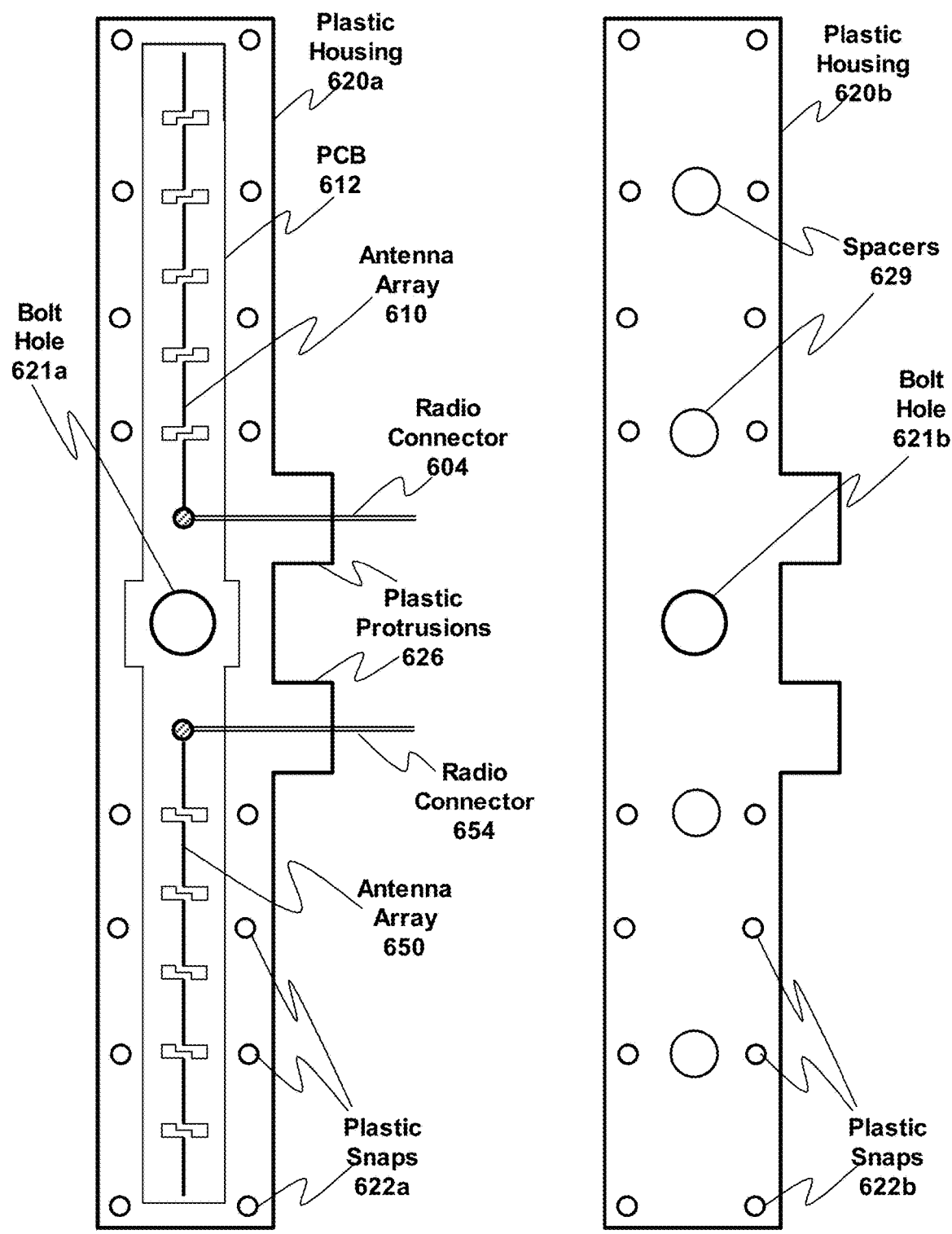
FIG. 6A illustrates an exemplary dual-channel antenna and assembly according to an embodiment.

FIG. 6A illustrates another exemplary antenna housing according to an embodiment. As shown in FIG. 6A, the dual-channel antenna comprises two antenna arrays 610, 650. The antenna arrays 610, 650 are arranged on a single PCB 612 that is placed on a flat piece of plastic 620a that makes up one part of a plastic housing. Each of the radio connectors 604, 654, which may be provided via a coaxial cable that include grounding for each antenna, is attached to the respective antenna array. The distance between the two antenna arrays 610, 650 may be increased to reduce interference from reflected signals from each antenna array.

As shown in FIG. 6A, the plastic housing 620a contains two protrusions 626 for the radio connectors 604, 654. According to an embodiment, the two protrusions 626 may have a slight indentation to indicate placement of the radio connectors 604, 654, as well as providing stress relief for the connector cables. For example, according to an embodiment, the protrusions may cover approximately 11 mm of cable.

A similar piece of plastic housing 620b is placed on top of the first piece 620a and the dual-channel antenna, sandwiching the dual-channel antenna between the two pieces of plastic housing 620a and 620b. According to an embodiment, when all pieces of the antenna assembly are together, the antenna assembly may be approximately 6.5 mm thick at the cables.

As shown in FIG. 6A, according to an embodiment, each piece of plastic housing 620a, 620b may include multiple small plastic spacers 629 placed along the length of the plastic housing piece 620a, 620b. These spacers provide a small air gap (for example, approximately 0.6 mm) that keeps the majority of the PCB 612 separated from the plastic housing 620a, 620b.

The pieces of the plastic housing 620a, 620b may be acrylic, ABS, or any thermal plastic. According to an embodiment, the plastic housing pieces 620a, 620b, may include plastic snaps 622a, 622b to fit the two housing pieces together. For example, on one piece of the plastic housing 620b, the plastic snaps 622b may consist of small protrusions while on the other piece of the plastic housing 620*a*, the plastic snaps 622*a* may consist of small holes. The plastic snaps help ensure proper alignment and stability of the two plastic housing pieces 620*a*, 620*b* when placed together.

Each of the plastic housing pieces 620*a*, 620*b* and PCB 612 may have a hole 621*a*, 621*b* in the middle. When the holes 621*a*, 621*b* in the plastic housing 620*a*, 620*b* and PCB 612 are aligned, an automotive rivet may be placed through all three components and inserted into a mirror casing of the vehicle's side mirror to mount to install the transceiver antenna.

Figure 6B:
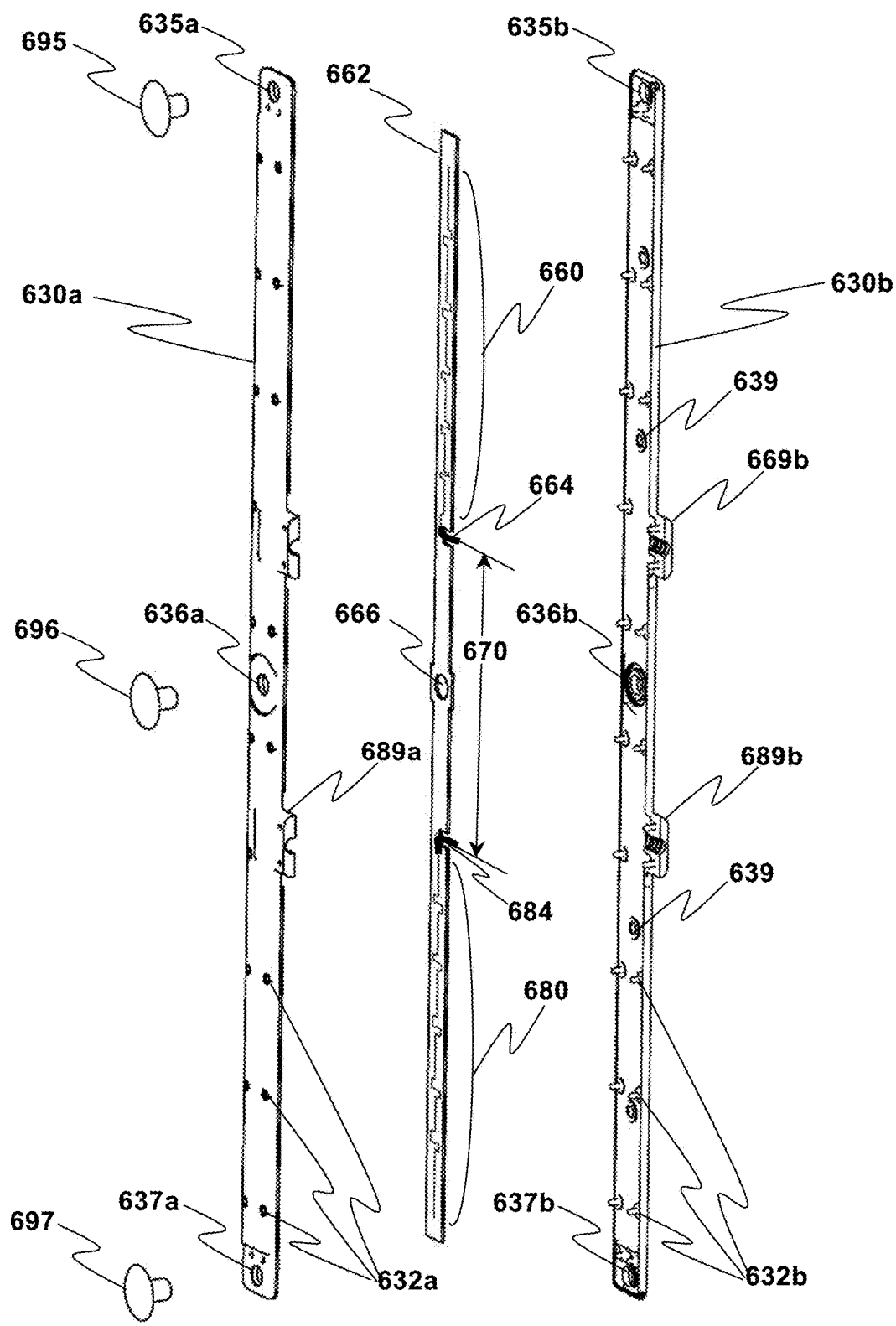
FIG. 6B illustrates an exemplary dual-channel antenna and assembly according to an embodiment.

FIG. 6B illustrates a three-dimensional view of an exemplary antenna housing according to an embodiment. As shown in FIG. 6B, the dual-channel antenna comprises two antenna arrays 660, 680. The antenna arrays 660, 680 are arranged on a single PCB 662 that is placed on a flat piece of plastic 635*b* that makes up one half of a plastic housing. The distance 670 between the radio connectors 664, 684 for the two antenna arrays 660, 680 may be increased to reduce interference from reflected signals from each antenna array.

As shown in FIG. 6B, the plastic housing piece 630*b* contains two protrusions 669*b*, 689*b* for radio connectors 664, 684. According to an embodiment, the two protrusions 669*b*, 689*b* may have a slight indentation to indicate placement of and to hold in place the radio connectors and to provide stress relief. A similar piece of plastic housing 635*a* is placed on top of the first piece 635*b* and the PCB 662, sandwiching the dual-channel antenna between the two pieces of plastic housing 635*a*, 635*b*.

The pieces of the plastic housing 630*a*, 630*b* may be acrylic, ABS, or any thermal plastic. According to an embodiment, the plastic housing pieces 630*a*, 630*b*, may include plastic snaps 632*a*, 632*b* to fit the two housing pieces together. For example, on one piece of the plastic housing 630*b*, the plastic snaps 632*b* may consist of small protrusions, while on the other piece of the plastic housing 630*a*, the plastic snaps 632*a* may consist of small holes. The plastic snaps help ensure proper alignment and stability of the two plastic housing pieces 630*a*, 630*b* when placed together.

Each of the plastic housing pieces 630*a*, 630*b* and PCB 662 may have a hole in the middle 636*a*, 636*b*, 666, respectively. When the holes 636*a*, 636*b*, 666 in each the plastic housing pieces 630*a*, 630*b* and the PCB 662 are aligned, an automotive rivet 696 may be placed through all three components and also inserted into a mirror casing of the automobile's side mirror to mount and install the antenna assembly. Similar rivets 695, 697 may be placed through the plastic pieces respectively through holes 635*a*, 635*b* at the top and holes 637*a*, 637*b* at the bottom of the antenna housing.

Figure 7:
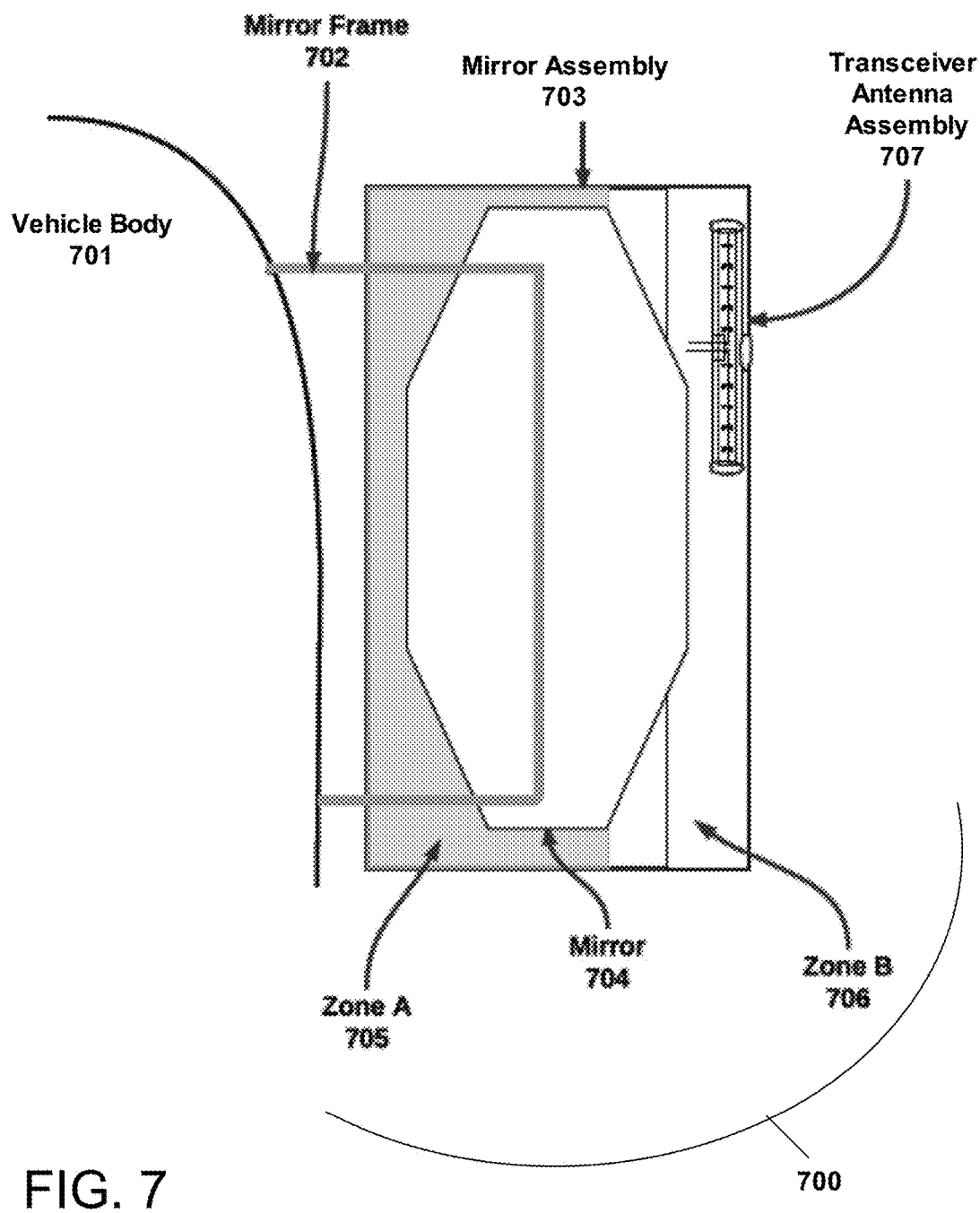
FIG. 7 illustrates an exemplary dual-channel antenna assembly in a side-view mirror of a vehicle according to an embodiment.

An antenna housing containing a transceiver antenna may then mounted inside each side mirror of a vehicle for use in a V2V communication system. FIG. 7 illustrates a vehicle side mirror 700 with an exemplary transceiver antenna assembly 707 mounted inside according to an embodiment. In an embodiment, the transceiver antenna comprises a dual-channel antenna, however, in some embodiments, the transceiver antenna may comprise a single channel antenna. As shown in FIG. 7, a typical vehicle side mirror 700 includes a mirror frame 702 attached to the body 701 (either cab or door) of the vehicle. The mirror frame 702 is typically a metal frame used to mount a mirror assembly 703 on the side of the vehicle body 701. Then a mirror 704 is installed in the mounted mirror assembly 703. Other components (not shown) are also typically mounted within the mirror casing including electrical and mechanical components for adjusting the mirror.

The transceiver antenna assembly 707 is mounted within the mirror and positioned to maximize signal reception while minimizing interference from the vehicle body 701, mirror frame 702, and mirror assembly 703. Because the mirror frame 702 and mirror 704 are typically made of metal and will interfere with signal transmission and reception, the transceiver antenna assembly 707 should be mounted away from the mirror frame 702 and mirror 704 if possible. FIG. 7 illustrates exemplary desirable region zone B 706 and undesirable region zone A 705 within the mirror assembly 703 to mount the transceiver antenna assembly 707.

The connectors to ground and to radio may then be fed through a connection between the mirror 704 and the vehicle body 701. According to an embodiment, the connectors are fed in the same path as the connections for the rest of the mechanics and electronics operating within the mirror assembly 703. Then the transceiver antenna attachments are connected to a radio device within the cab of the vehicle that processes the received signals and creates signals for transmission.

Figure 8A:
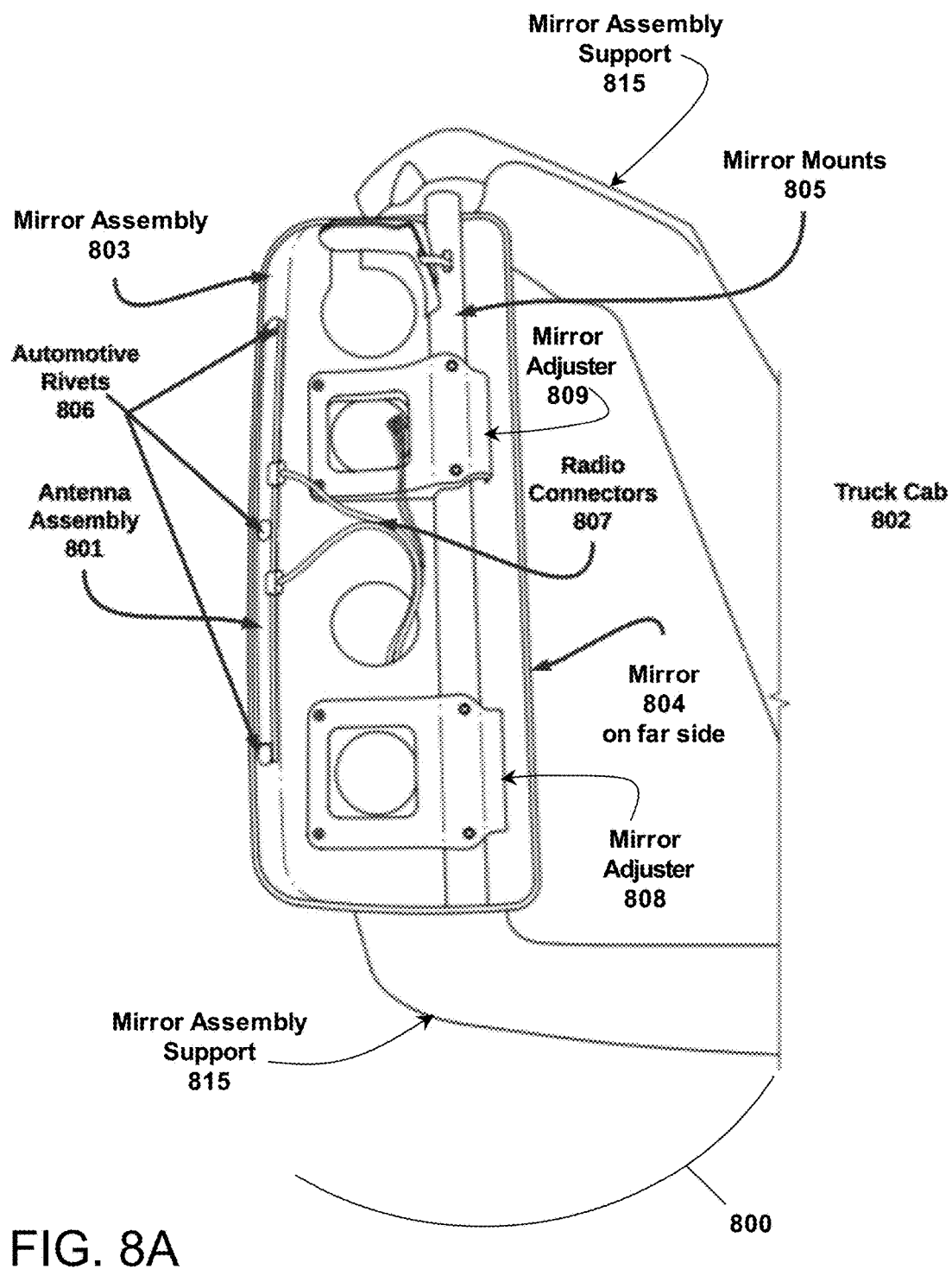
FIG. 8A illustrates an exemplary antenna assembly mounted inside a side-view mirror assembly for a truck according to an embodiment.
Figure 8B:
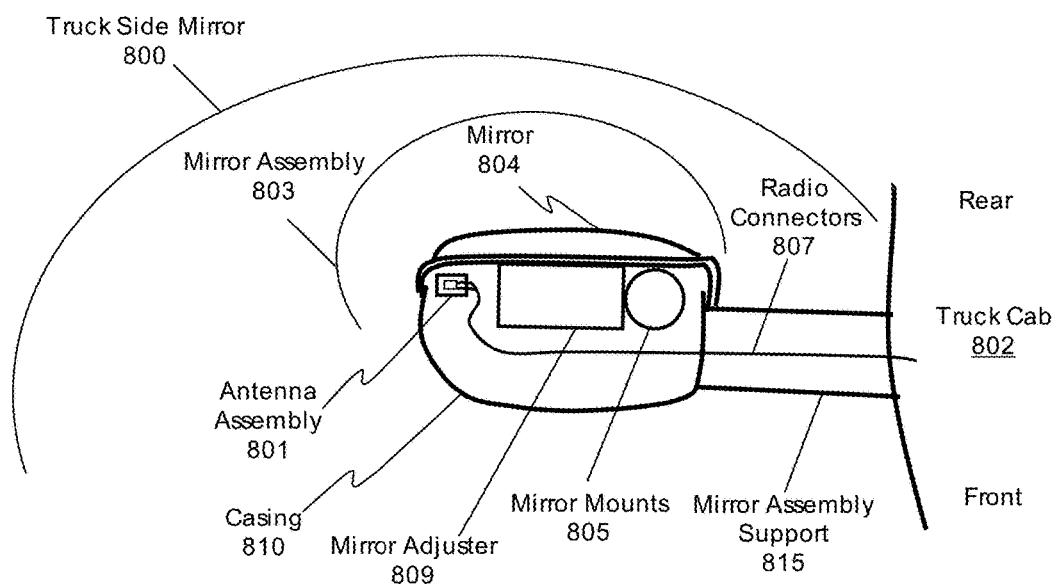
FIG. 8B illustrates a top-view of the side view mirror assembly of FIG. 8A.

FIGS. 8A and 8B illustrates an exemplary transceiver antenna assembly 801 installed in a truck side mirror 800 attached to a truck cab 802 using two mirror assembly supports 815. FIG. 8A presents a view of a mirror assembly 803 as seen from the front of the truck with the casing removed, and FIG. 8B shows a top view of the same mirror assembly with the casing 810 attached. In FIGS. 8A and 8B, an antenna assembly 801 comprising the transceiver antenna 801 is mounted on the back of the mirror assembly 803, behind the other mirror electronics and mirror adjusters 808, 809, and positioned to maximize signal reception while minimizing interference from the truck cab 802, mirror assembly 803, mirror 804, mirror mounts 805, and mirror adjusters 808, 809. The antenna assembly 801 may have some flexibility for ease of installation. One or more automotive rivets 806 may be used to mount the antenna assembly to the mirror housing.

According to an embodiment, an RF reflective material, such as a piece of reflective tape, i.e. a tape with a metallic film on one side, (not shown), may be placed between the antenna assembly 801 and the truck cab 802. This reflective material may limit the interference from signals reflected off the truck cab 802 received at the antenna assembly 801. In an embodiment, the reflective material may be approximately the same length as the PCB of the antenna assembly 801 and may optimally be placed 20-30 mm away from the antenna assembly 801. To achieve this spacing, the antenna assembly 801 may be installed on the back or outside of the mirror assembly 803 and the reflective material installed inside the mirror assembly 803.

The antenna assembly 801 should preferably be mounted inside the mirror casing 810. The antenna assembly 801 may be completely contained within the casing, and invisible from outside the mirror assembly 803. The mirror casing 810 is preferably made from a non-conducting material such as plastic that therefore causes minimal RF interference. Non-conducting plastics such as polycarbonate typically have a volume conductivity smaller than $10^{-6}$ μS/m (as compared, for example, to pure deionized water or dry wood, which have a volume conductivity on the order of approximately 5 μS/m, or steel, which has a volume conductivity of approximately $10^6$ S/m). Some embodiments may specify the conductivity of the casing material at the RF frequencies of DSRC communications instead of using the steady state volume conductivity numbers presented above.

The connectors to ground and to radio 807 for the antenna assembly may then be fed in the same path as the connections for the rest of the mechanics and electronics operating within the mirror housing. Then the transceiver antenna attachments are connected to a radio device within the cab of the truck cab 802 that processes the received signals and creates signals for transmission.

According to an embodiment, two channels may be used to transmit vehicle data and/or A/V data between vehicles. Two channels are desirable for redundancy and signal diversity, especially for vehicle data. Each antenna array may transmit on one of the same two channels between the trucks. For example, a dual-channel antenna in the driver's side mirror may transmit and receive data over two channels, one dedicated for each antenna in the dual-channel antenna. Then, a dual-channel antenna in the passenger's side mirror may transmit and receive data over the same two channels, one dedicated for each antenna in the dual-channel antenna. Data transmitted between antennas may be encrypted and signed according to any known encryption and verification method. Such encryption and verification ensures the fidelity of the received messages.

According to an embodiment, the transceiver antenna assemblies described herein may be used to assist with the platooning of large trucks. As described herein, the transceiver antenna may be used in conjunction with a semi-autonomous vehicle convoying system to provide a safe and efficient system for convoying or platooning. Elements of active vehicle monitoring and control in combination with the communication techniques described herein permit drivers of both a lead and a following vehicle to have a clear understanding of their environment and road conditions, including with a variety of visual displays, while offering increased convenience for automatic driving control.

Assisted platooning of large trucks enables the trucks to follow closely, or platoon, behind each other to reduce drag related fuel costs in a convenient and safe manner. Platooning trucks may move within a few feet of each other, for example with a gap between them anywhere from 10 feet to 200 feet. Initial communications, however, may be exchanged when two trucks are up to 500 feet apart. When two or more trucks are in close proximity, they may rapidly and continually exchange environmental, control, video, or other information, thereby effectively establishing a link between the trucks in order to aid with establishing and maintaining effective platooning. Communications shared between trucks in the short or medium distance of the platooning range may improve situational awareness as well as detection and monitoring of neighboring vehicles.

According to an embodiment, once two trucks have been identified for platooning, information may be exchanged between the two trucks to effectuate close following. For example, the lead truck may provide control information such as current speed, relative distance to the other truck, braking application and/or pressure, engine or drivetrain torque, system faults, accelerometer data, tire pressure, information about obstacles or other vehicles detected in front of the lead truck, etc. to the other platooning trucks. When this information is successfully shared with another truck, the information can be passed to the driver to encourage the driver to act, such as by speeding up or slowing down. Alternatively, a system within the truck may be engaged to automatically control the acceleration and braking of the following truck based on the information received from another truck.

According to an embodiment, a following truck may receive specific directions, rather than merely useful data, from a lead truck, and can implement those directions at the following truck for effective platooning. For example, if the front truck begins braking, the braking signal information may be transmitted immediately from the front truck as vehicle information via DSRC to the following truck, which can begin braking in synchrony with the front truck. Similarly, the lead truck may be encouraged to speed up or slow down based on similar information received from the following truck. Therefore, each truck may be aware of the state of all of the other platooning trucks.

A dual-channel antenna may receive information on both channels and convey the received information to a radio or receiver. The received information may then be processed by a processor located within the cab of the truck. Such processing may include the parsing of different information types and the determination of how the information should be used.

In the event of a loss of signal between the antennas of platooning trucks, certain safety precautions may be implemented. For example, the trailing vehicles may be instructed to immediately start slowing so that if the lead truck begins braking while the connection is lost, a safe gap between the trucks can still be maintained.

According to an embodiment, platooning trucks may also exchange AN data. For example, the two drivers may communicate with each other using an audio link provided between the two trucks. This has some advantage over Citizen's Band (CB) broadcast radio communications, in that the DSRC communication may be set up to be encrypted and decrypted only between the two vehicles, providing privacy for the communication. In some embodiments, the following truck may receive video from a camera placed in the lead truck. In some instances, only the following truck may receive video data, while in other instances, the lead truck may receive video data from the following truck.

For example, the video data may be displayed on a screen or user interface within the truck. Traditionally the driver of a following truck sees primarily the back of the lead truck and some small amount of space to each side of the lead truck. However, according to an embodiment, a display may be provided to the driver of the following truck that shows video data captured by a forward-looking camera in the lead truck. This display will then provide the driver of the following truck an unobstructed view of what is ahead of the pair of trucks. The driver of the following truck may then have similar knowledge of the road ahead as the driver of the lead truck and may operate the following truck accordingly. For example, the driver of the following truck may observe and react to unexpected developments that otherwise may not have been seen, such as road hazards, wild animals at the side of the highway, traffic conditions, etc.

The screen or other user interface may be visor or dash mounted, or in any other convenient location visible to the driver. The A/V data may also be used to detect and prevent drifting within or out of the road lane, for example, by calculating any drift or offset with the lane guides for the lead truck or with the tail end of a leading truck for a following truck. Upon detection of a drift or offset, a notification or alert may be sent to the driver of the drifting vehicle and corrective action taken.

According to an embodiment, multiple trucks may be linked for platooning. For example, safe platoons of three or more trucks may be initiated where the middle truck acts as both a lead truck (to the rear-most truck) and a following truck (to the lead truck). Then the middle truck may transmit and receive information from both of the other trucks.

According to an embodiment, additional vehicles may communicate with the platooning trucks. For example, passenger vehicles or light trucks may establish communication with one or more trucks via the dual-channel antenna described herein.

Looking at FIG. 8, it can be appreciated that side mirrors that are large enough, and protrude far enough out from a truck cab, to provide sufficient visibility for large and long tractor-trailers, also will provide significant wind resistance, and therefore drag, thereby decreasing gas mileage. To provide an equivalent rear-looking view along the sides of a vehicle, it is possible to provide video cameras in different locations around a tractor-trailer, with one or more view screens in the cab. Such cameras are typically much smaller than mirrors, will not need to protrude as far as side mirrors do, and will therefore will provide less drag.

Figure 9A:
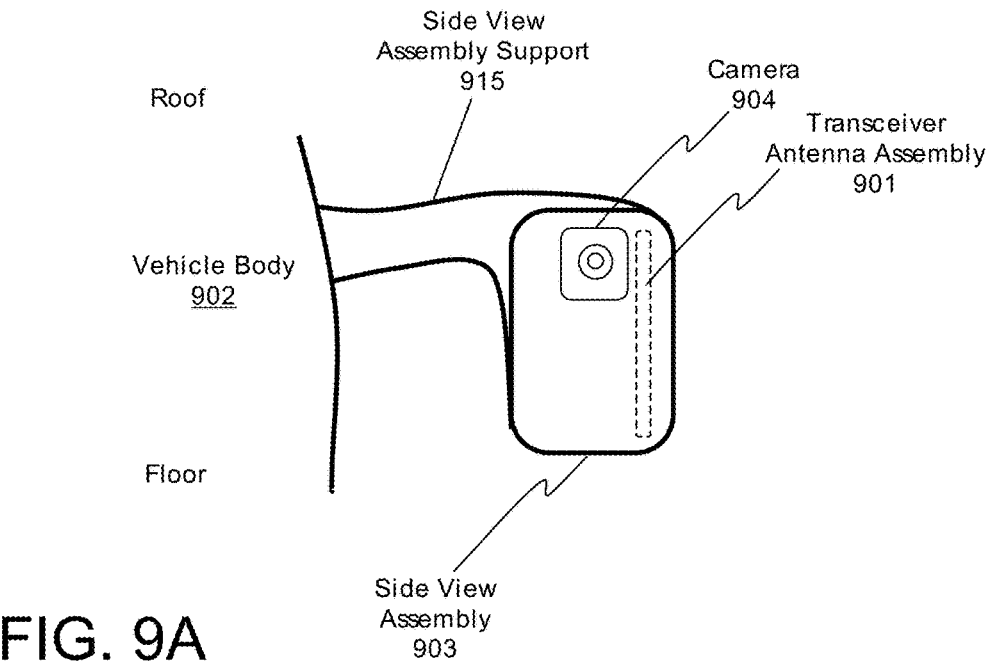
FIG. 9A illustrates an exemplary antenna assembly mounted inside a side-view camera housing according to an embodiment.
Figure 9B:
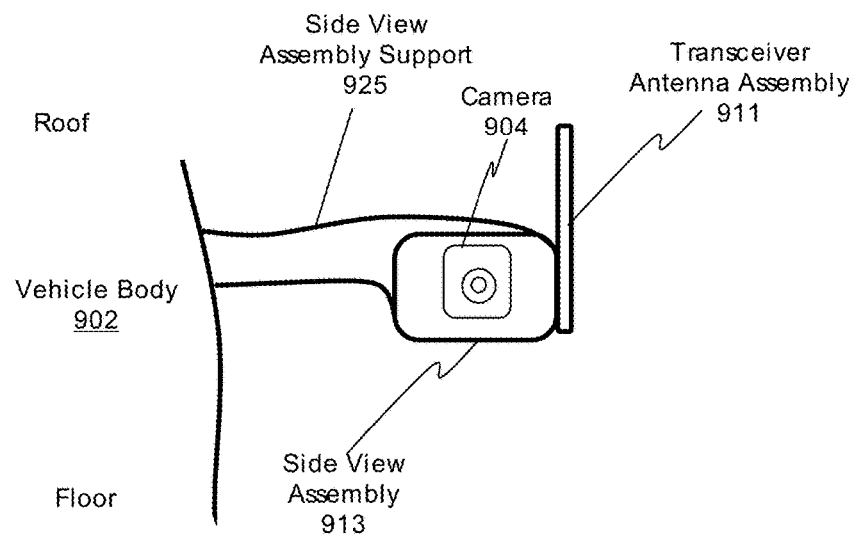
FIG. 9B illustrates an exemplary antenna assembly mounted outside a side-view camera housing according to an embodiment.

FIGS. 9A and 9B illustrate rear view assemblies for vehicles using a video camera mounted to the side of a vehicle. In FIG. 9A, a side view assembly 903 is mounted to a vehicle body 902 or side door with a side view assembly support 915. The side view assembly 903 comprises a camera 904 for viewing back along the side of the vehicle, and also comprises a transceiver antenna assembly 901 contained within the side view assembly 903 and invisible from the outside of the side view assembly 903. In FIG. 9B, a side view assembly 913 is mounted to a vehicle body 902 or side door with a side view assembly support 925. The side view assembly 913 comprises a camera 904 for viewing back along the side of the vehicle, and also comprises an antenna assembly 911 mounted to the outside of the side view assembly 913. Antenna array placement within or attached to one or more casings for smaller side-mounted rear-viewing assemblies comprising cameras may preserve line-of-sight for communication between a lead vehicle and a following vehicle, while presenting a smaller wind drag than encountered with larger side view mirror assemblies.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A system for communicating between a plurality of trucks, each truck having a cab which, when connected with a trailer in a tractor-trailer configuration, articulates as the truck turns, each cab having two side mirrors, one side mirror being mounted on each side of the cab, the system comprising:
  for each cab:
    two antennas, each mounted in a respective side mirror of the cab,
    and
    two antenna housings to mount each of the antennas in the respective side mirror; and
  the system further comprising, at each cab:
    a radio, connected to the antennas for that cab,
    to manage transmission and reception of information transmitted and received via the antennas,
    the antennas being mounted within the side mirrors, and the side mirrors being mounted on each cab, so as to maintain, when any of the trucks having the tractor-trailer combination articulates, and when the plurality of trucks are arranged to include a lead truck and a following truck, line-of-sight communication between at least one antenna of the two antennas on the lead truck and at least one antenna of the two antennas on the following truck; wherein
    the antennas are dual-channel antennas, the dual-channel antennas configured to transmit and receive data over both a first channel and a second, different channel; and
    each dual-channel antenna comprises a first antenna and a second antenna,
    wherein the first antenna and the second antenna are aligned in a collinear direction along a common axis of orientation.

2. The system of claim 1, wherein
the antennas are dual-channel antennas, the dual-channel antennas configured to transmit and receive data over both a first channel and a second, different channel; and
both channels of each dual-channel antenna carry vehicle data.

3. The system of claim 1, wherein
the antennas are dual-channel antennas, the dual-channel antennas configured to transmit and receive data over both a first channel and a second, different channel; and
a single channel of each dual-channel antenna carries audio/video data.

4. The system of claim 1, wherein
the antennas are dual-channel antennas, the dual-channel antennas configured to transmit and receive data over both a first channel and a second, different channel; and
each dual-channel antenna is implemented on a single printed circuit board.

5. The system of claim 1, wherein
the radio operates in a Dedicated Short Range Communications (DSRC) band.

6. A two-way communication method among two or more trucks, each truck having a cab which, when connected with a trailer in a tractor-trailer configuration, articulates as the truck turns, each of the trucks having two side mirrors, one side mirror being mounted on each side of the cab, the method comprising:
  communicating information between a pair of said two or more trucks using a dual-channel transceiver antenna mounted in each side mirror of each truck in the pair, the dual-channel transceiver antennas configured to transmit and receive data over both a first channel and a second, different channel while the pair of trucks, in a configuration with a lead truck and a following truck maintain line-of-sight communication between at least one of the dual-channel transceiver antennas on the lead truck and at least one of the dual-channel transceiver antennas of the following truck; and
  managing communicated information with a radio in each truck,
  the radio connected to the dual-channel transceiver antennas mounted in respective side mirrors of the respective truck to manage transmission and reception of the communicated information transmitted and received via the dual-channel transceiver antennas; wherein the antennas are dual-channel antennas, the dual-channel antennas configured to transmit and receive data over both a first channel and a second, different channel; and
  each dual-channel antenna comprises a first antenna and a second antenna,
  wherein the first antenna and the second antenna are aligned in a collinear direction along a common axis of orientation.

7. The method of claim 6, wherein
the radio operates in a Dedicated Short Range Communications (DSRC) band.

8. The method of claim 6, further comprising communicating vehicle data over both channels of each dual-channel transceiver antenna.

9. The method of claim 6, further comprising communicating audio/video data over a single channel of each dual-channel transceiver antenna.

10. A rear view assembly for a cab which, when connected with a trailer to form a truck in a tractor-trailer configuration, articulates as the truck turns, each cab having two rear view assemblies, one rear view assembly being mounted on each side of the cab, the rear view assembly comprising:
   a casing mounted on a side of the cab;
   a viewing device in an adjustable mount attached to the casing and positioned to provide a rear-looking view along the side of the tractor-trailer configuration; and
   at least one antenna assembly comprising a dual-channel antenna to transmit and receive radio frequencies, the dual-channel antenna configured to transmit and receive data over a first channel and a second, different channel,
   said at least one antenna assembly contained within the casing, and the casing being mounted on the cab, so as to maintain, when the truck having the tractor-trailer configuration articulates, line-of-sight communication between the truck and either a leading truck in a leading tractor-trailer configuration, or a following truck in a following tractor-trailer configuration; wherein
   each dual-channel antenna comprises a first antenna and a second antenna, and
   wherein the first antenna and the second antenna are aligned in a collinear direction along a common axis of orientation.

11. The rear view assembly of claim 10, wherein the casing is fabricated from a material with an electrical conductivity less than 10 µS/m.

12. The rear view assembly of claim 10, wherein the antenna assembly is not visible from the outside of the rear view assembly.

13. The rear view assembly of claim 10, wherein the viewing device is a mirror.

14. The rear view assembly of claim 10, wherein the viewing device is a camera.

* * * * *